United States Patent Office 2,722,519
Patented Nov. 1, 1955

2,722,519

RADIATION SENSITIVE GLASS

Kurt O. Otley, Washington, D. C., and Woldemar A. Weyl, State College, Pa., assignors to the United States of America as represented by the Secretary of the Army No Drawing. Application November 3, 1952,
Serial No. 318,520

2 Claims. (Cl. 252—408)

This invention relates to radiation detectors and more particularly to a glass which fades when subjected to high energy radiation.

It is an object of the present invention to provide a colored glass which changes color when subjected to high energy radiation.

It is a further object to provide a normally blue glass which is progressively bleached when subjected to X-ray and gamma radiation, so that it is possible to set up a calibration scale for different depths of blue, corresponding to different doses of radiation.

In accordance with the present invention, there is provided a blue glass which is progressively bleached when subjected to high-energy radiation comprising an alkali tetraborate, boron trioxide, and sulfur.

For a better understanding of the present invention, together with other and further objects thereof, reference is had to the following description and its scope will be pointed out in the appended claims.

It has been found that if sulfur or an alkali sulfide is incorporated into a sodium borate glass of relatively low acidity, a brown glass is obtained which derives its color from the formation of polysulfides. On addition of some boric acid, this glass changes its color to blue, probably because of the formation of $S_2$ molecules. The glass has an absorption spectrum wtih a broad maximum between 5000 and 6000 Angstrom units. Upon irradiation with X-rays, this absorption band decreases and the blue glass is progressively bleached. The change in color may be observed either with a visual or photoelectric photometer.

Such a blue glass is prepared by melting 20 parts of sodium tetraborate with 10 parts of boron trioxide and 1.5 parts of pure sulfur in a Globar furnace at 900° C. This glass is gradually bleached when it is exposed to high-energy radiation such as X-ray or gamma radiation.

Potassium and aluminum may be substituted for the sodium in this glass and the blue glass can also be prepared by fusing sulfur with potassium aluminum borate by the same aforementioned method. The blue color center of the glass is assumed to be identical with that of lapis lazuli or artificial ultramarine and consists of $S_2$ molecules.

When exposed to high-energy radiation, this blue glass is equally sensitive to both X-ray and gamma radiation. Small amounts of radiation have a measurable effect upon the glass and it is, therefore, possible to set up a calibration scale for different depths of blue corresponding to different doses of high-energy radiation. Small differences in color intensity which cannot be discerned by the human eye may be detected with the aid of a colored filter and a photocell. An added advantage of this glass is the very slow rate of the reverse reaction after the cessation of the irradiation. The bleached glass regains its blue color quite slowly. The bleaching of the blue glass upon its exposure to high-energy radiation is probably due to the trapping of an electron by the $S_2$ molecule and its change into the colorless $S_{-2}$ ion.

While there has been described what at present is considered to be the preferred embodiment of the invention, it will be understood by those skilled in the art that various changes and modifications may be made herein without departing from the invention and therefore aimed in the appended claims to cover all such modifications as fall within the spirit and scope of the invention.

What is claimed is:

1. A normally blue glass which is progressively bleached when subjected to high energy radiation consisting essentially of about 20 parts by weight of sodium tetraborate, about 10 parts by weight of boron trioxide, and about 1.5 parts by weight of sulfur.

2. A method for making a normally blue glass which is progressively bleached when subjected to high-energy radiation consisting of fusing about 20 parts by weight of sodium tetraborate, about 10 parts by weight of boron trioxide and about 1.5 parts by weight of sulfur at about 900° C.

References Cited in the file of this patent

UNITED STATES PATENTS 971,124    Egly _____ Sept. 27, 1910

OTHER REFERENCES

Chemical Abstracts, vol. 33, page 824 (1939).